(12) United States Patent
    Chang

(10) Patent No.: US 11,370,507 B2
(45) Date of Patent: Jun. 28, 2022

(54) CONTINUOUSLY VARIABLE RECIPROCATING PRIME MOVER AND VEHICLE COMPRISING THE SAME

(71) Applicant: Chun-Jong Chang, Zhubei (TW)

(72) Inventor: Chun-Jong Chang, Zhubei (TW)

( * ) Notice: Subject to any disclaimer, the term of this patent is extended or adjusted under 35 U.S.C. 154(b) by 217 days.

(21) Appl. No.: 16/908,850

(22) Filed: Jun. 23, 2020

(65) Prior Publication Data

US 2020/0407017 A1    Dec. 31, 2020

Related U.S. Application Data

(60) Provisional application No. 62/868,869, filed on Jun. 29, 2019.

(51) Int. Cl.

| | | |
|---|---|---|
| *B62M 13/02* | (2006.01) | |
| *B62M 1/28* | (2013.01) | |
| *B62K 5/08* | (2006.01) | |
| *B62K 3/00* | (2006.01) | |
| *B62M 1/32* | (2013.01) | |
| *B62M 1/30* | (2013.01) | |
| *B62M 1/34* | (2013.01) | |
| *B62M 1/24* | (2013.01) | |

(52) U.S. Cl.
    CPC ............. *B62M 13/02* (2013.01); *B62K 5/08* (2013.01); *B62M 1/28* (2013.01); *B62K 3/005* (2013.01); *B62M 1/24* (2013.01); *B62M 1/30* (2013.01); *B62M 1/32* (2013.01); *B62M 1/34* (2013.01)

(58) Field of Classification Search
    CPC .......... B62M 13/02; B62M 1/28; B62M 1/24; B62M 1/30; B62M 1/32; B62M 1/34; B62K 5/08; B62K 3/005
    See application file for complete search history.

(56) References Cited

U.S. PATENT DOCUMENTS

| | | | | |
|---|---|---|---|---|
| 10,752,317 | B1 * | 8/2020 | Jones | B62M 1/18 |
| 11,048,251 | B2 * | 6/2021 | Wood | G05D 1/0257 |
| 11,052,944 | B2 * | 7/2021 | Kabos | G01S 17/42 |
| 11,256,264 | B2 * | 2/2022 | Hoofard | G05D 1/0225 |
| 2018/0346061 | A1 * | 12/2018 | Tan | B62K 21/02 |
| 2019/0023349 | A1 * | 1/2019 | Luo | B62M 11/06 |
| 2019/0039425 | A1 * | 2/2019 | Dodd | G05D 1/0088 |

* cited by examiner

*Primary Examiner* — Minnah L Seoh
*Assistant Examiner* — Marlon A Arce

(57) ABSTRACT

The present invention disclose a continuously variable reciprocating prime mover. The feature of this continuously variable reciprocating prime mover is that the reciprocating rotatory motion of the legs is modified into the reciprocating linear flexion and extension of the legs, by which one leg is flexed while the other leg is stretching, the combined force of the legs can be multiplied by the force. After each linear motion stroke is completed, the reverse linear motion stroke is repeated, and the driving direction remains unchanged. At any moment of the full stroke of the reciprocating linear flexion and extension of the legs, both can generate 2 times of the instantaneous power equivalent to the maximum moment point of the circular rotation.

11 Claims, 9 Drawing Sheets

CONTINUOUSLY VARIABLE
RECIPROCATING PRIME MOVER AND
VEHICLE COMPRISING THE SAME

This application claims the benefit of U.S. provisional patent application No. 62/868,869, filed on Jun. 29, 2019, and the entirety of which is incorporated by reference herein.

BACKGROUND OF THE INVENTION

Field of the Invention

This invention relates to a reciprocating prime mover and a vehicle comprising the same, and particularly relates to a continuously variable reciprocating prime mover and a vehicle comprising the same.

Description of the Related Art

During the period of 1867 to 1885, the development of bicycles in Western Europe has been gradually fixed and become a familiar appearance in the world today. In the past 130 years, although flywheels, chains, pneumatic tires, and transmission mechanisms have been invented to improve riding efficiency or comfort, the basic structure of bicycles has not undergone fundamental changes. The most ingrained element is the rotary pedaling prime mover.

As shown in FIGS. 5A~5C, it shows a schematic diagram of a conventional rotary pedaling prime mover at different pedaling angles, wherein R is the turntable lever arm, F is the pedaling force of a leg, A is the angle of forward rotation from the top dead center, B is the angle between the handle and the horizontal plane, B+A=90 degrees, F∕ is the component of F in the direction parallel to R, F⊥ is F in the direction perpendicular to R, and the downward pedaling by gravity will produce a torque τ=F×R×sin(A), or τ=F×R×cos (B). Generally speaking, the effective torque applied to the pedal is onl in the range of 90 degrees from 2 o'clock to 4 o'clock, and when the pedal reaches the 3 o'clock direction, the moment τ generated by gravity pedaling down can reach the maximum value, that is, τ=F×R. However, when one leg applies force to the pedal lever arm R of the turntable, the lifting of the other leg does not apply torque to the turntable, unless the pedal is equipped with shoe covers or shoe clips, and even if the leg force is greater than the body weight, as long as the human body sitting on the chair cushion, the maximum force that the rider can step on is only the body weight, unless the human body leans forward from the seat and pulls the arms upwards to pull the arms downwards to increase the downward pressure on the pedals. The movement of "stand-up pedaling" has the opportunity to exert pressure under excess body weight; if it is a reclining or recumbent bicycle, although the foot is stepped forward or pulled back (when there is a shoe cover or a shoe jam), each cycle is additional invalid power consumption of leg lift must be applied from bottom dead center to top dead center.

In view of the shortcomings of the above-mentioned rotatory pedaling prime mover, a prime mover that can provide the most effective work is highly expected by the industry. Therefore, the present invention disclose a continuously variable reciprocating prime mover. The feature of this continuously variable reciprocating prime mover is that the reciprocating rotatory motion of the legs is modified into the reciprocating linear flexion and extension of the legs, by which one leg is flexed while the other leg is stretching, the combined force of the legs can be multiplied by the force. After each linear motion stroke is completed, the reverse linear motion stroke is repeated, and the driving direction remains unchanged. At any moment of the full stroke of the reciprocating linear flexion and extension of the legs, both can generate 2 times of the instantaneous power equivalent to the maximum moment point of the circular rotation, that is, the moment when the gravity is stepped down, τ=(F1+F2)×R×sin(90 degrees)=(F1+F2)×R×cos (0 degrees)=(F1+F2)×R≅2×F×R.

SUMMARY OF THE INVENTION

One aspect of this invention is to provide a continuously variable reciprocating prime mover, comprising: a first roller coupled to a driving axis, wherein the driving axis comprises a first spiral reel and a second spiral reel symmetrical to each other relative to the driving axis, and the first spiral reel intertwines with the second spiral reel but not overlaps with each other, and the mechanical angle between the first spiral reel and the second spiral reel is 180°, wherein the first spiral reel has a first end terminal and a second end terminal respectively locating in the most inward and in the most outward of the first spiral reel, and the first spiral reel winds outwardly along with the driving axis and gradually changes its diameter, and the second spiral reel has a third end terminal and a fourth end terminal respectively locating in the most inward and in the most outward of the second spiral reel, and the second spiral reel winds outwardly along with the driving axis and gradually changes its diameter; a second roller coupled to a stationary shaft; a rope, wherein one terminal of the rope is fixed on the first end terminal of the first spiral reel to make the rope adjacent to the first end terminal of the first spiral reel be gradually winded from inward of the first spiral reel to outward of the first spiral reel and draw out of the first spiral reel at a first contact point of the first spiral reel, and then guided to wind the second roller and enter into the second spiral reel to make the other terminal of the rope be fixed on the fourth end terminal of the second spiral reel to make the rope adjacent to the fourth end terminal of the second spiral reel be gradually winded from outward of the second spiral reel to inward of the second spiral reel and draw out of the second spiral reel at a second contact point of the second spiral reel to form a closed loop, wherein the first contact point of the first spiral reel and the second contact point of the second spiral reel are on positions of an opposite mechanical angle, and the distance between the first contact point and the first end terminal equals to the distance between the second contact point and the third end terminal, and the rope has at least a tight linear moving part between the first roller and the second roller, and when the first contact point where the rope is pulled out of the first spiral reel locates at the second end terminal of the first spiral reel, the second contact point where the rope is pulled out of the second spiral reel will locate at the fourth end terminal of the second spiral reel; a forcing apparatus coupled to the rope, wherein the forcing apparatus can be moved forward or backward along with the linear moving part of the rope, when the forcing apparatus is moved forward along with the linear moving part of the rope, the rope is pulled out of the first spiral reel and drawn into the second spiral reel, and the length pulled out of the first spiral reel is equal to the length drawn into the second spiral reel, and the first contact point and second contact point gradually leave away from the second end terminal and the fourth end terminal, and the distance between the first contact point and the second contact point decrease gradually, and when the forcing apparatus move backward along with the linear moving part of the rope, the rope is drawn into of the first spiral reel and pulled out the second spiral reel, and the length pulled out of the second spiral reel is equal to the length drawn into the first spiral reel, and the first contact point and second contact point gradually approach the second end terminal and the fourth end terminal, and the distance between the first contact point and the second contact point increase gradually; and a gear change mechanism provided on the rope between the first roller and the second roller, and the gear change mechanism can be controlled to vertically move up or down relative to the rope, wherein part of the rope is pulled out of the first spiral reel and part of the rope is drawn into the second spiral reel when the gear change mechanism is switched to high gear to decrease the distance between the first contact point and the second contact point by making the first contact point and the second contact point respectively be far away from the second end terminal and the forth end terminal, and wherein part of the rope is pulled out of the second spiral reel and part of the rope is drawn into the first spiral reel when the gear change mechanism is switched to low gear to increase the distance between the first contact point and the second contact point by making the first contact point and the second contact point respectively be close to the second end terminal and the forth end terminal, thereby continuous variable speed can be achieved by switching the gear change mechanism between high gear and low gear to decrease or increase the distance between the first contact point and the second contact point during the forcing apparatus moves forward or backward along with the linear moving part to continuously change its average torque in a stroke range.

The continuously variable reciprocating prime mover as mentioned above, wherein the rope is made of a single material or joined by ropes made of different materials.

The continuously variable reciprocating prime mover as mentioned above, wherein the gear change mechanism further comprises a movable pulley assembly, and part of the rope is pulled out of the first spiral reel and part of the rope is drawn into the second spiral reel when the gear change mechanism is switched to high gear to decrease the distance between the first contact point and the second contact point, and part of the rope is pulled out of the second spiral reel and part of the rope is drawn into the first spiral reel when the gear change mechanism is switched to low gear to increase the distance between the first contact point and the second contact point.

The continuously variable reciprocating prime mover as mentioned above, further comprising a pulley between the first roller and the second roller to provide the rope with a tight linear moving part between the first roller and the second roller.

The continuously variable reciprocating prime mover as mentioned above, further comprising a one-way clutch, wherein the first roller is coupled to the driving axis through the one-way clutch, and the torque generated by the forcing apparatus is transmitted to the driving axis through the one-way clutch when the rope is pulled out of the first spiral reel, and the torque generated by the forcing apparatus is not transmitted to the driving axis through the one-way clutch when the rope is pulled out of the second spiral reel which contributes the driving axis to be rotated along with a single direction.

Another aspect of this invention is to provide a vehicle, comprising a continuously variable reciprocating prime mover as mentioned above.

Another aspect of this invention is to provide another vehicle, comprising two continuously variable reciprocating prime movers as mentioned above, and the driving axes of the continuously variable reciprocating prime movers are coaxial or heteraxial.

The vehicle as mentioned above, the driving axes of the continuously variable reciprocating prime movers are coaxial, and the one-way clutches of the continuously variable reciprocating prime movers are coupled to the driving axes in the same rotation direction, and speeds of the driving axes are changed synchronously.

The vehicle as mentioned above, wherein the driving axes of the continuously variable reciprocating prime movers are heteraxial, and the one-way clutches of the continuously variable reciprocating prime movers are coupled to the driving axes in the same rotation direction, and speeds of the driving axes are changed asynchronously.

DETAILED DESCRIPTION OF THE INVENTION

Embodiment 1

Figure 1A:
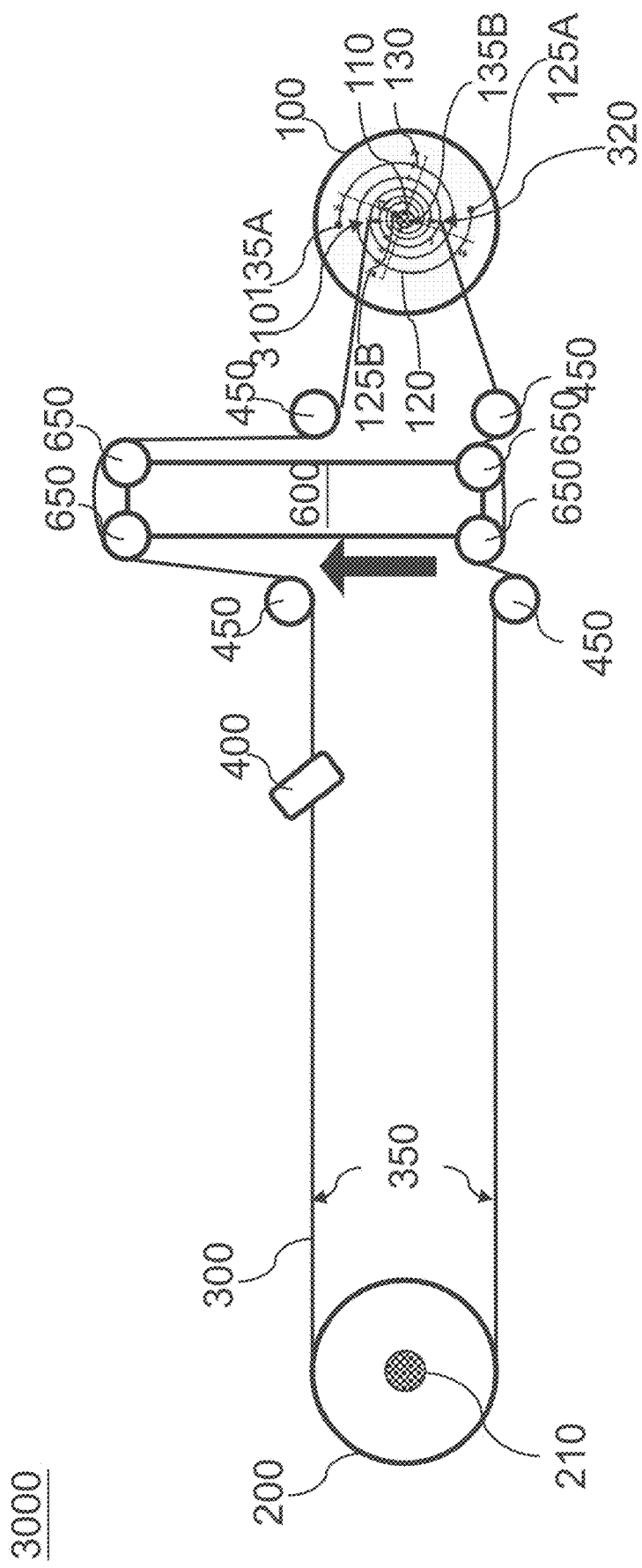
FIGS. 1A~1D illustrate side views of the continuously variable reciprocating prime mover 3000 at different movement stages according to Embodiment 1 of this invention.

Embodiment 1 will describe and explain accompanying with FIGS. 1A~1D side views illustrating the continuously variable reciprocating prime mover 3000 of this invention at different movement stages.

As shown in FIGS. 1A~1D, the continuously variable reciprocating prime mover 3000 of this invention comprises: a first roller 100, a second roller 200, a rope 300, a forcing apparatus 400 and a gear change mechanism 600. The first roller 100 is coupled to a driving axis 110, wherein the driving axis 110 comprises a first spiral reel 120 and a second spiral reel 130 symmetrical to each other relative to the driving axis 110, and the first spiral reel 120 intertwines with the second spiral reel 130 but not overlaps with each other, and the mechanical angle between the first spiral reel 120 and the second spiral reel 130 is 180°. The first spiral reel 120 has a first end terminal 125A and a second end terminal 125B respectively locating in the most inward and in the most outward of the first spiral reel 120, and the first spiral reel 120 winds outwardly along with the driving axis 110 and gradually changes its diameter, and the second spiral reel 130 has a third end terminal 135A and a fourth end terminal 135B respectively locating in the most inward and in the most outward of the second spiral reel 130, and the second spiral reel 130 winds outwardly along with the driving axis 110 and gradually changes its diameter. The second roller 200 is coupled to a stationary shaft 210. One terminal of the rope 300 is fixed on the first end terminal 125A of the first spiral reel 120 to make the rope 300 adjacent to the first end terminal 125A of the first spiral reel 120 be gradually winded from inward of the first spiral reel 120 to outward of the first spiral reel 120 and draw out of the first spiral reel 120 at a first contact point 310 of the first spiral reel 120, and then guided to wind the second roller 200 and enter into the second spiral reel 130 to make the other terminal of the rope 300 be fixed on the fourth end terminal 135B of the second spiral reel 130 to make the rope 300 adjacent to the fourth end terminal 135B of the second spiral reel 130 be gradually winded from outward of the second spiral reel 130 to inward of the second spiral reel 130 and draw out of the second spiral reel 130 at a second contact point 320 of the second spiral reel 130 to form a closed loop, wherein the first contact point 310 of the first spiral reel 120 and the second contact point 320 of the second spiral reel 130 are on positions of an opposite mechanical angle, and the distance between the first contact point 310 and the first end terminal 125A equals to the distance between the second contact point 320 and the third end terminal 135A, and the rope 300 has at least a tight linear moving part 350 between the first roller 100 and the second roller 200. The forcing apparatus 400 coupled to the rope 300 can be moved forward or backward along with the linear moving part of the rope 300.

Figure 1B:
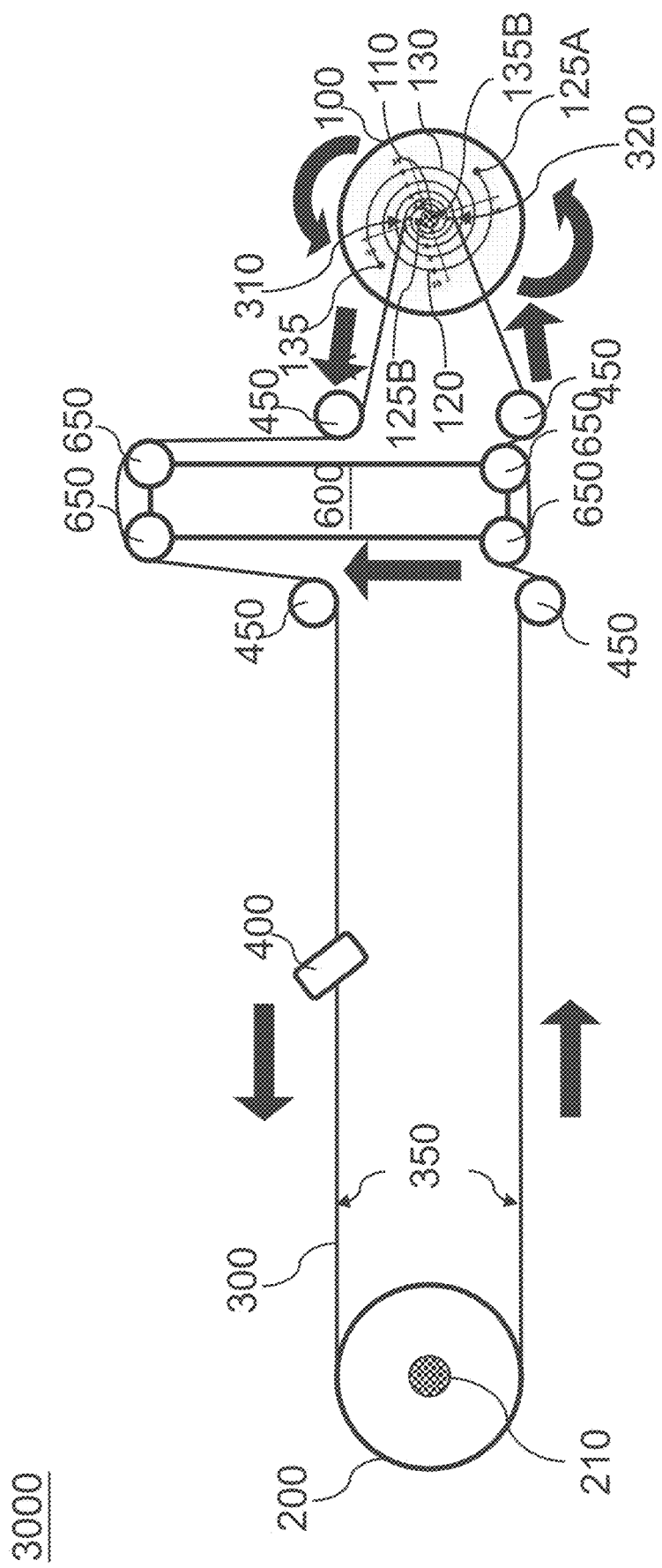
Figure 1C:
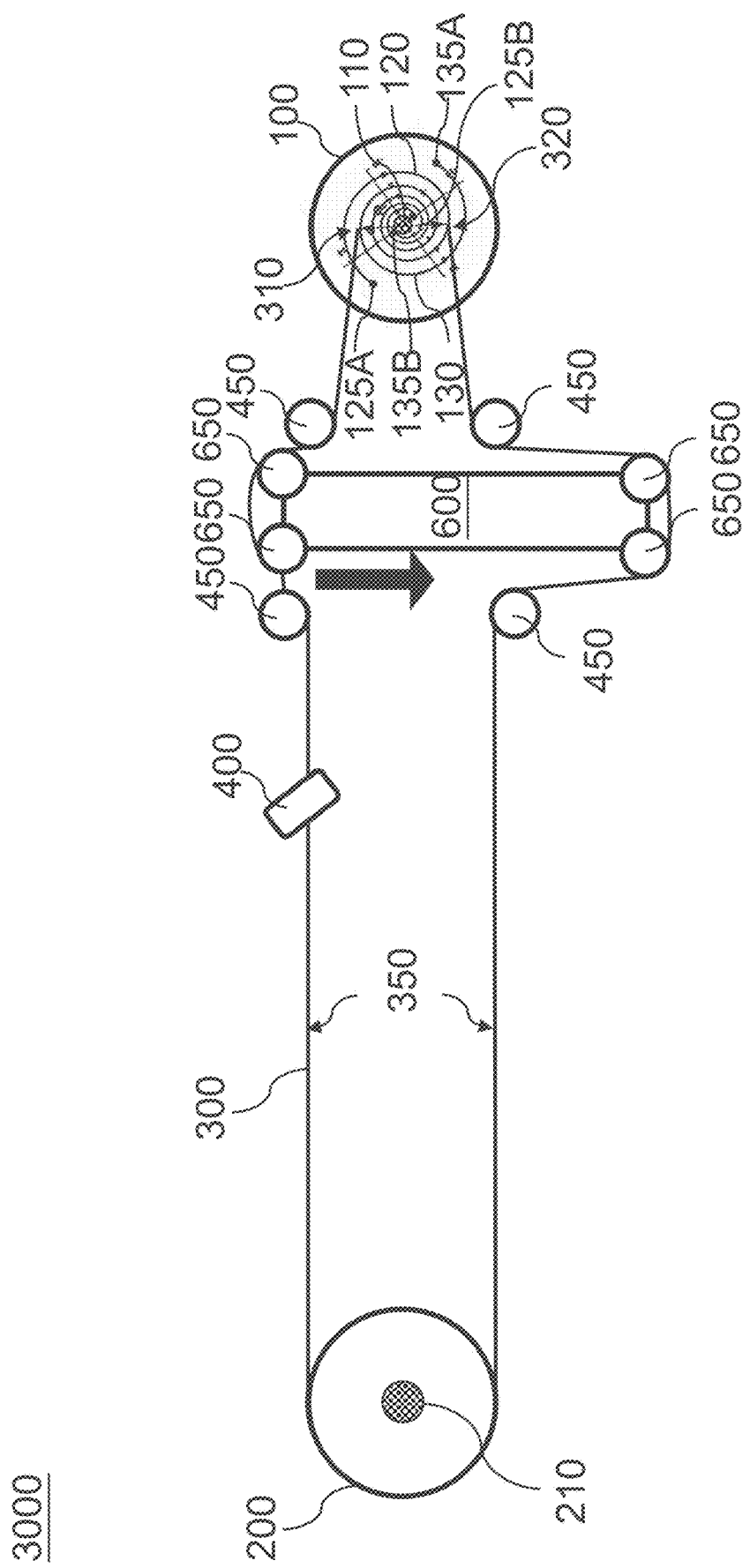

The gear change mechanism 600 is provided on the rope 300 between the first roller 100 and the second roller 200, and the gear change mechanism 600 can be controlled to vertically move up or down relative to the rope 300. As shown in FIG. 1A, when the gear change mechanism 600 is switched to high gear, the movable pulley assembly 650 is vertically moved up relative to the rope 300 when the forcing apparatus is stationary to contribute a part of the rope 300 to be pulled out of the first spiral reel 120 and part of the rope 300 be drawn into the second spiral reel 130 to decrease the distance R between the first contact point 310 and the second contact point 320, and the distance R between the first contact point 310 and the second contact point 320 is further decreased when the forcing apparatus 400 is moved forward along with the linear movement part 350 as shown in FIG. 1B. As shown in FIG. 1C, when the gear change mechanism 600 is switched to low gear, the movable pulley assembly 650 is vertically moved down relative to the rope 300 when the forcing apparatus is stationary to contributes a part of the rope 300 to be pulled out of the second spiral reel 130 and part of the rope 300 be drawn into the first spiral reel 120 to increase the distance R between the first contact point 310 and the second contact point 320, and the distance R between the first contact point 310 and the second contact point 320 is further increased when the forcing apparatus 400 is moved backward along with the linear movement part 350.

Figure 1D:
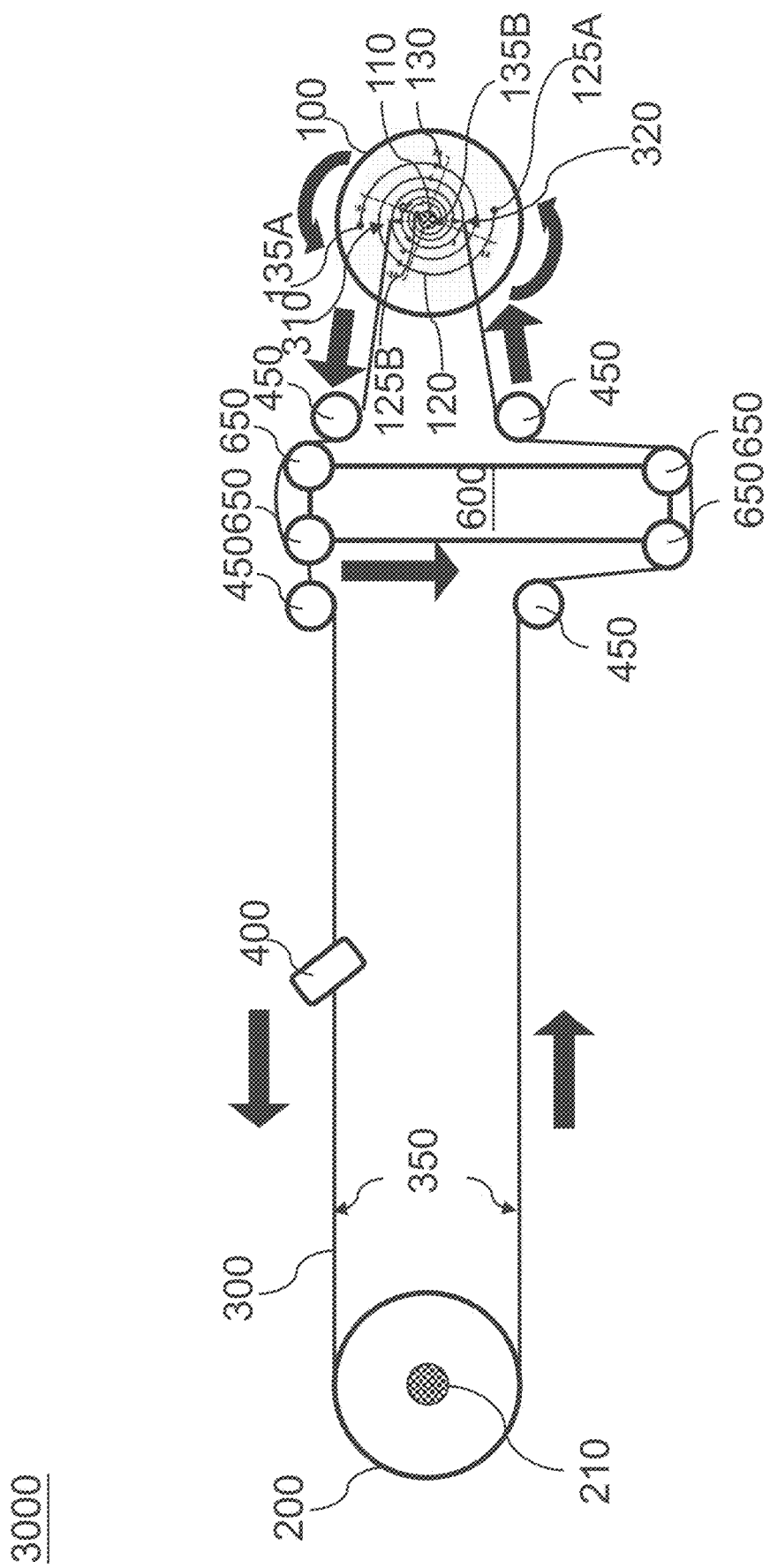

The continuously variable reciprocating prime mover 3000 according to this present Embodiment 1 can provide continuous variable speed by switching the gear change mechanism 600 between high gear and low gear to decrease or increase the distance R between the first contact point 310 and the second contact point 320 during the forcing apparatus 400 moves forward or backward along with the linear moving part 350 as shown in FIG. 1D to continuously change its average torque in a stroke range. The rope 300 of the continuously variable reciprocating prime mover 3000 according to this present Embodiment 1 can be is made of a single material or joined by ropes made of different materials.

According to other embodiments of this invention, the above-mentioned continuously variable reciprocating prime mover 3000 can further comprise pulleys 450 between the first roller 100 and the second roller 200 to provide the rope 300 with a tight linear moving part 350 between the first roller 100 and the second roller 200.

According to other embodiments of this invention, the above-mentioned continuously variable reciprocating prime mover 3000 can further comprise a one-way clutch (not shown), wherein the first roller 100 is coupled to the driving axis 110 through the one-way clutch (not shown), and the torque generated by the forcing apparatus 400 is transmitted to the driving axis 110 through the one-way clutch (not shown) when the rope 300 is pulled out of the first spiral reel 120, and the torque generated by the forcing apparatus 400 is not transmitted to the driving axis 110 through the one-way clutch (not shown) when the rope is pulled out of the second spiral reel 130 which contributes the driving axis 110 to be rotated along with a single direction.

Embodiment 2

Figure 2:
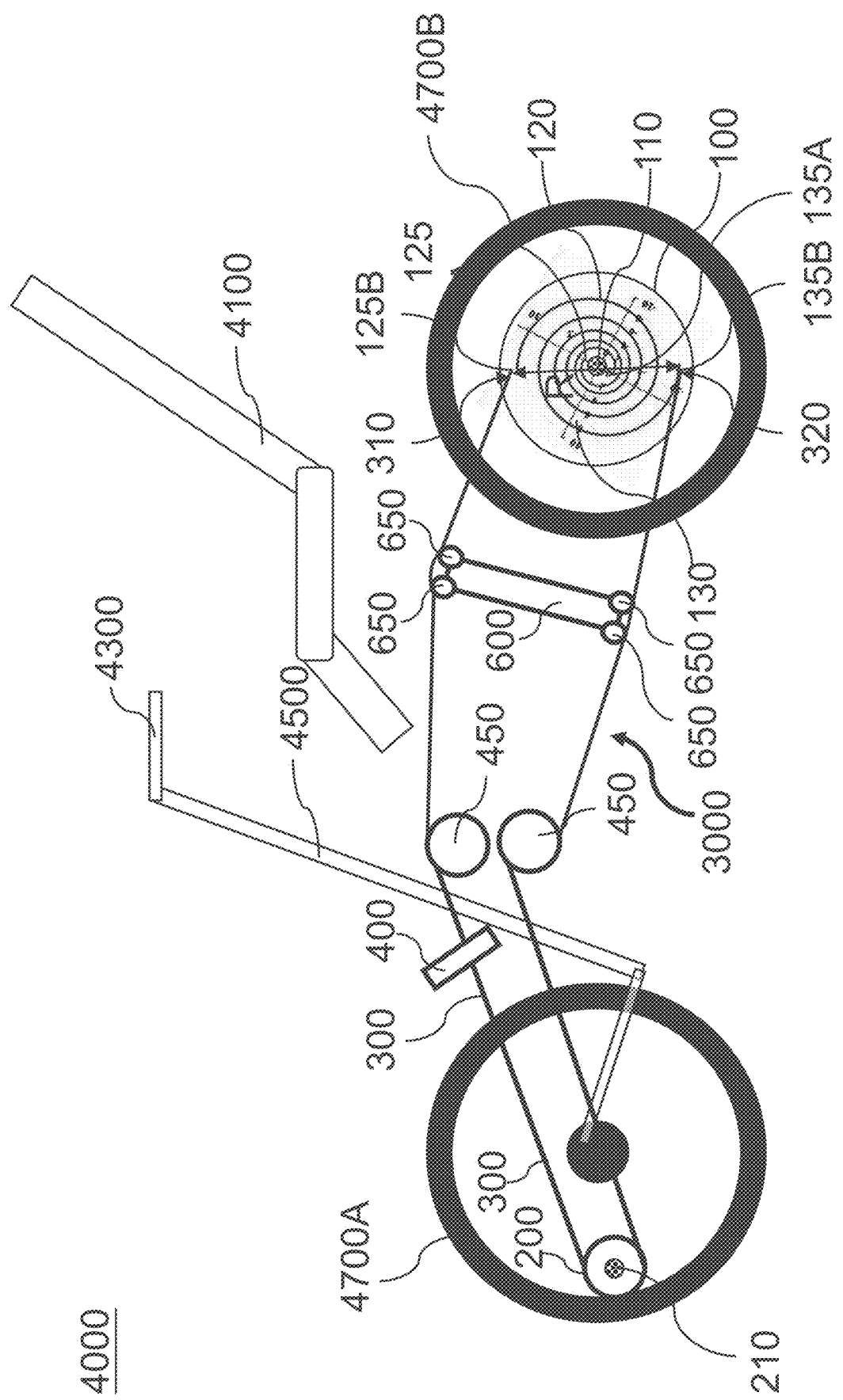
FIG. 2 illustrates a side view of a rear-wheel driving bicycle 4000 of this invention.

As shown in FIG. 2, the rear-wheel driving bicycle 4000 of this present Embodiment 2 comprises a continuously variable reciprocating prime mover 3000 as disclosed in Embodiment 1, a saddle 4100, a handlebars 4300, a frame 4500, a free wheel 4700A and a rear-driving wheel 4700B.

As shown in FIG. 2, the rear-wheel driving bicycle 4000 of this present Embodiment 2, the rear-driving wheel 4700B can be driven by the continuously variable reciprocating prime mover 3000 as disclosed in Embodiment 1. The continuously variable reciprocating prime mover 3000 as disclosed in Embodiment 1 can work as mentioned above.

Embodiment 3

Figure 3:
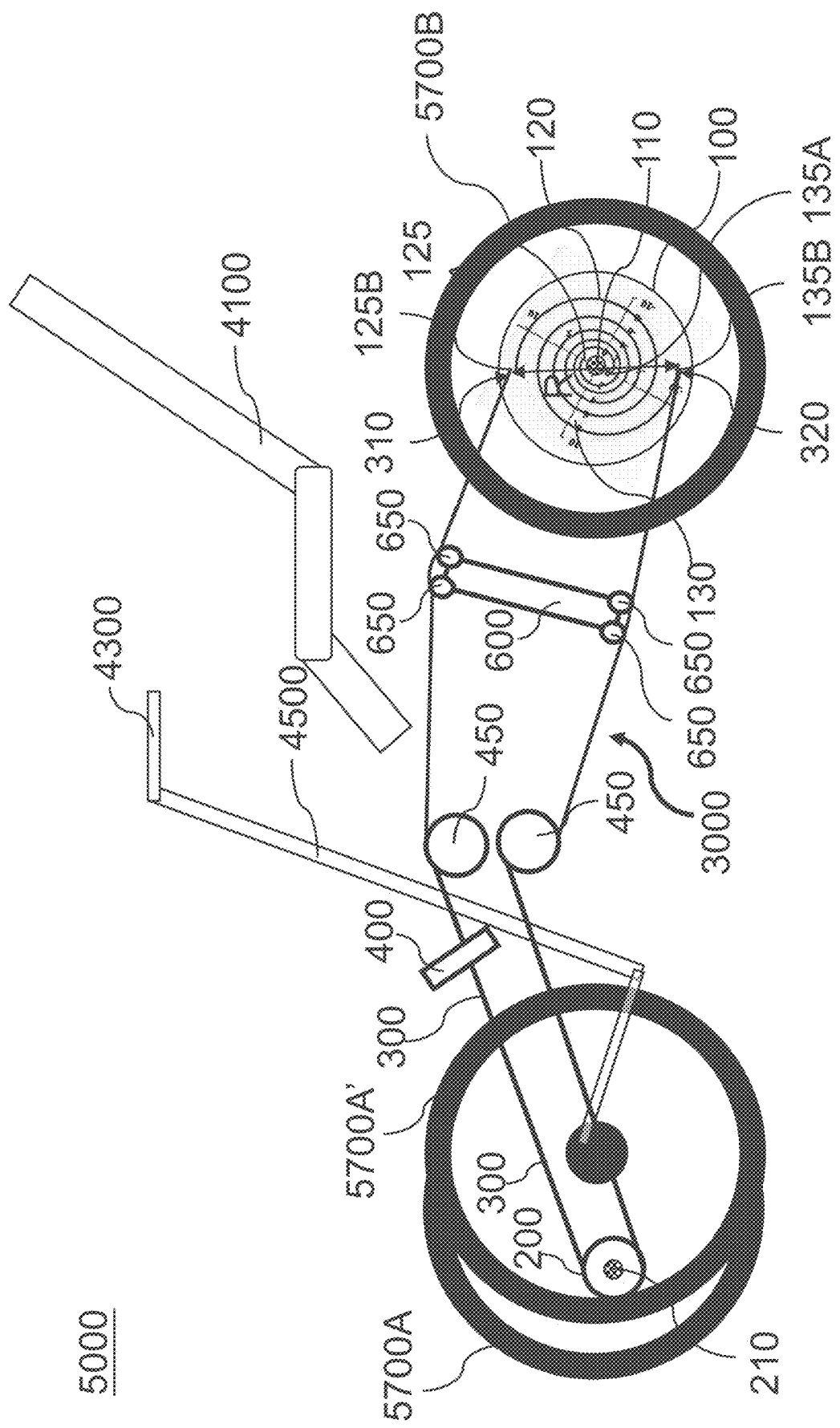
FIG. 3 illustrates a side view of a rear-wheel driving tricycle 5000 of this invention.

As shown in FIG. 3, the rear-wheel driving tricycle 5000 of this present Embodiment 3 comprises a continuously variable reciprocating prime mover 3000 as disclosed in Embodiment 1, a saddle 4100, a handlebars 4300, a frame 4500, a right free wheel 4700C, a left free wheel 4700C', and a rear-driving wheel 4700B.

As shown in FIG. 3, the rear-wheel driving tricycle 5000 of this present Embodiment 3, the rear-driving wheel 4700B can be driven by the continuously variable reciprocating prime mover 3000 as disclosed in Embodiment 1. The continuously variable reciprocating prime mover 3000 as disclosed in Embodiment 1 can work as mentioned above.

Furthermore, according to other embodiment of this invention, the rear-wheel driving tricycle 5000 can comprises two continuously variable reciprocating prime movers 3000 as disclosed in Embodiment 1, and the driving axes of those two continuously variable reciprocating prime movers 3000 can be coaxial or heteraxial. When the driving axes of the continuously variable reciprocating prime movers 3000 are coaxial, and the one-way clutches (not shown) of the continuously variable reciprocating prime movers 3000 are coupled to the driving axes 110 in the same rotation direction, and speeds of the driving axes 110 are changed synchronously. When the driving axes of the continuously variable reciprocating prime movers 3000 are heteraxial, and the one-way clutches (not shown) of the continuously variable reciprocating prime movers 3000 are coupled to the driving axes 110 in the same rotation direction, and speeds of the driving axes 110 are changed asynchronously.

Embodiment 4

Figure 4A:
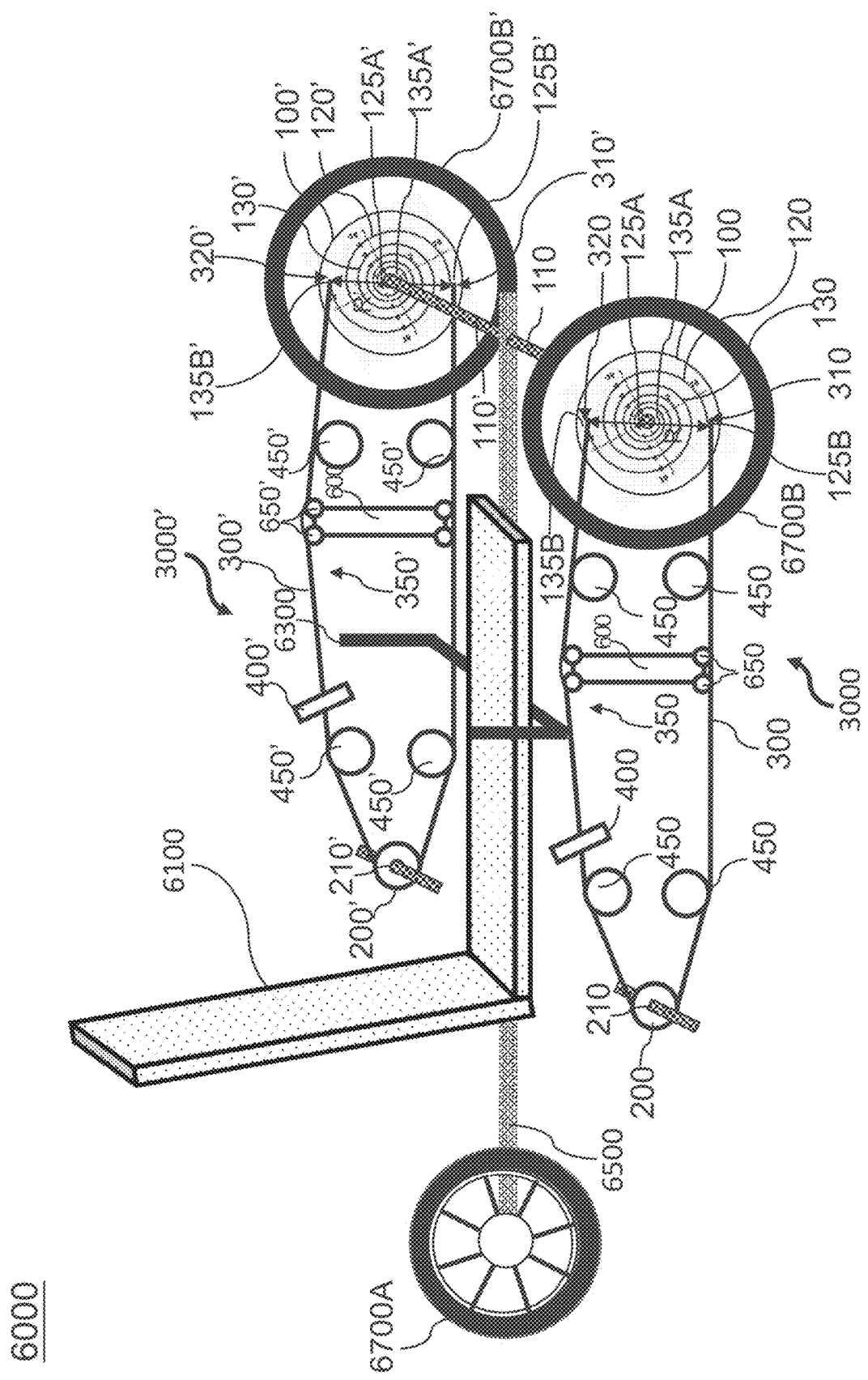
FIG. 4A~4B illustrate side views of a front-wheels driving tricycle 6000 of this invention.
Figure 4B:
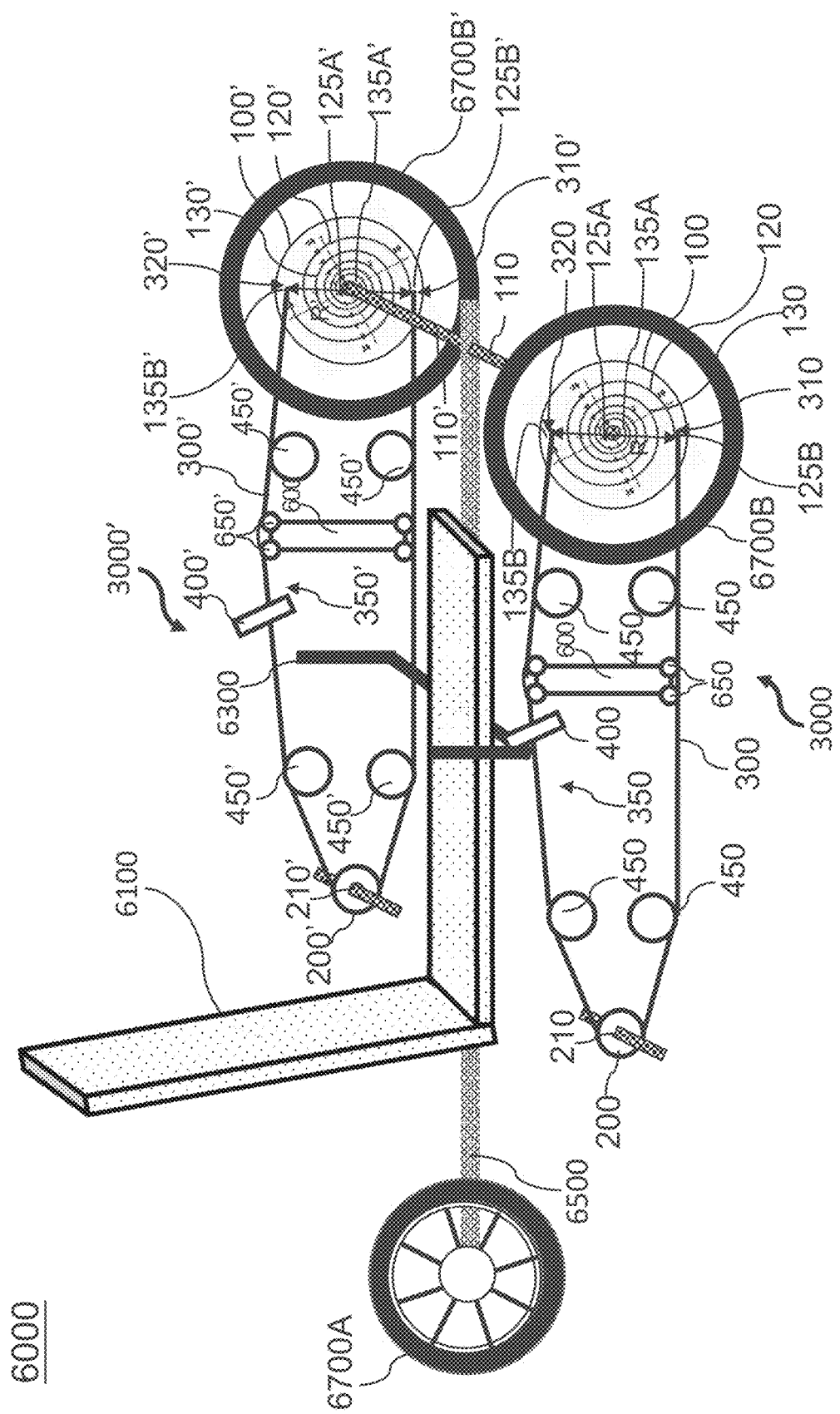
Figure 5A:
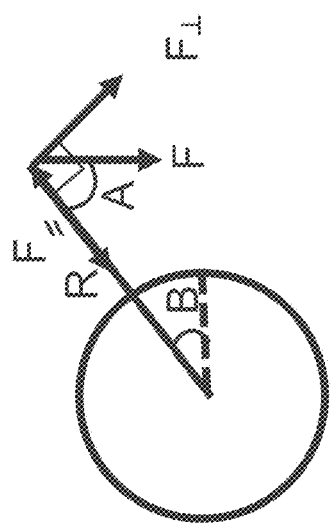
FIG. 5A~5C are schematic diagrams showing a conventional rotary prime mover at different pedaling angles.
Figure 5B:
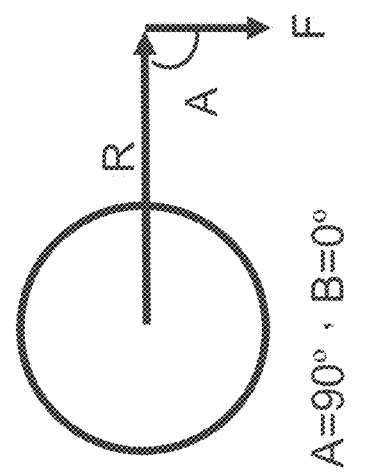
Figure 5C:
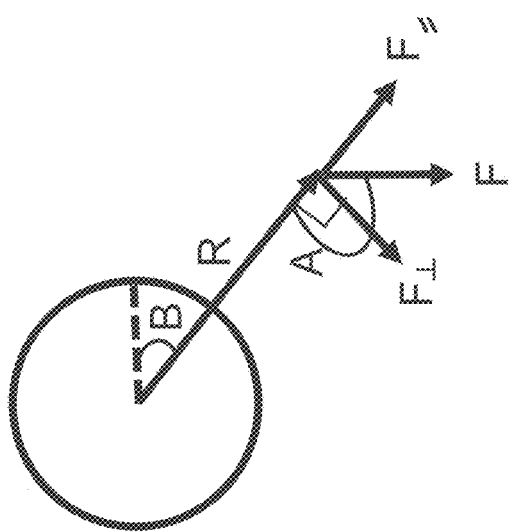

FIG. 4A~4B illustrate side views of a front-wheels driving tricycle 6000 of this invention. As shown in FIG. 4A, the front-wheels driving tricycle 6000 of this present Embodiment 4 comprises a saddle 6100, a handlebars 6300, a frame 6500, a right driving wheel 6700B, a left driving wheel 6700B', a rear-free wheel 6700A, a continuously variable reciprocating prime mover 3000 as disclosed in Embodiment 1 placed on the right driving wheel 6700B, and a continuously variable reciprocating prime mover 3000' with identical structure as the continuously variable reciprocating prime mover 3000 disclosed in Embodiment 1 placed on the left driving wheel 6700B'.

The structure of the continuously variable reciprocating prime mover 3000 is described as disclosed in Embodiment 1. The continuously variable reciprocating prime mover 3000' with identical structure as the continuously variable reciprocating prime mover 3000 disclosed in Embodiment 1 comprises a first roller 100', a second roller 200', a rope 300', a forcing apparatus 400' and a gear change mechanism 600'. The first roller 100 is coupled to a driving axis 110', wherein the driving axis 110' comprises a first spiral reel 120' and a second spiral reel 130' symmetrical to each other relative to the driving axis 110', wherein the first spiral reel 120' intertwines with the second spiral reel 130' but not overlaps with each other, and the mechanical angle between the first spiral reel 120' and the second spiral reel 130' is 180°. The first spiral reel 120' has a first end terminal 125A' and a second end terminal 125B' respectively locating in the most inward and in the most outward of the first spiral reel 120', and the first spiral reel 120' winds outwardly along with the driving axis 110' and gradually changes its diameter, and the second spiral reel 130' has a third end terminal 135A' and a fourth end terminal 135B' respectively locating in the most inward and in the most outward of the second spiral reel 130', and the second spiral reel 130' winds outwardly along with the driving axis 110' and gradually changes its diameter. The second roller 200' is coupled to a stationary shaft 210'. One terminal of the rope 300' is fixed on the first end terminal 125A' of the first spiral reel 120' to make the rope 300' adjacent to the first end terminal 125A' of the first spiral reel 120' be gradually winded from inward of the first spiral reel 120' to outward of the first spiral reel 120' and draw out of the first spiral reel 120' at a first contact point 310' of the first spiral reel 120', and then guided to wind the second roller 200' and enter into the second spiral reel 130' to make the other terminal of the rope 300' be fixed on the fourth end terminal 135B' of the second spiral reel 130' to make the rope 300' adjacent to the fourth end terminal 135B' of the second spiral reel 130' be gradually winded from outward of the second spiral reel 130' to inward of the second spiral reel 130' and draw out of the second spiral reel 130' at a second contact point 320' of the second spiral reel 130' to form a closed loop, wherein the first contact point 310' of the first spiral reel 120' and the second contact point 320' of the second spiral reel 130' are on positions of an opposite mechanical angle, and the distance between the first contact point 310' and the first end terminal 125A' equals to the distance between the second contact point 320' and the third end terminal 135A', and the rope 300' has at least a tight linear moving part 350' between the first roller 100' and the second roller 200'. The forcing apparatus 400' coupled to the rope 300' can be moved forward or backward along with the linear moving part of the rope 300'.

As shown in FIG. 4B, when the forcing apparatuses 400, 400' are moved forward along with the linear moving parts 350, 350' of the ropes 300, 300', the ropes 300 and 300' are respectively pulled out of the first spiral reels 120, 120' and drawn into the second spiral reels 130, 130', and the lengths pulled out of the first spiral reel 120, 120' are equal to the lengths drawn into the second spiral reels 130, 130', and the first contact points 310/310' and second contact points 320/320' gradually leave away from the second end terminals 125B/125B' and the fourth end terminal 135B/135B', and the distances R, R' between the first contact points 310/310' and the second contact points 320/320' decrease gradually, and when the forcing apparatuses 400, 400' are moved backward along with the linear moving parts 350, 350' of the ropes 300, 300', the ropes 300, 300' are drawn into of the first spiral reels 120, 120' and pulled out the second spiral reels 130, 130', and the lengths pulled out of the second spiral reels 130, 130' are equal to the lengths drawn into the first spiral reels 120, 120', and the first contact points 310/310' and second contact points 320/320' gradually approach the second end terminals 125B/125B' and the fourth end terminals 135B/135B', and the distances R, R' between the first contact points 310/310' and the second contact points 320/320' increase gradually. The right driving wheel 6700B and the left driving wheel 6700B' can respectively be driven by the driving axes 110 and 110' of the continuously variable reciprocating prime movers 3000 and 3000' by decreasing or increasing the distances R, R' between the first contact points 310/310' and the second contact points 320/320' when the forcing apparatuses 400, 400' are moved forward or backward along with the linear moving parts 350, 350' to continuously change its average torque in a stroke range. The continuously variable reciprocating prime movers 3000 and 3000' can respectively further comprise one-way clutches (not shown), wherein the first roller 100, 100' are coupled to the driving axis 110, 110' through the one-way clutches (not shown), and the torques generated by the forcing apparatuses 400, 400' are transmitted to the driving axes 110, 110' through the one-way clutches (not shown) when the ropes 300, 300' are pulled out of the first spiral reels 120, 120', and the torques generated by the forcing apparatuses 400, 400' are not transmitted to the driving axes 110, 110' through the one-way clutches (not shown) when the ropes are pulled out of the second spiral reels 130, 130' which contribute the driving axes 110, 110' to respectively be rotated along with a single direction.

The gear change mechanisms 600, 600' are respectively provided on the ropes 300, 300' between the first rollers 100, 100' and the second rollers 200, 200', and the gear change mechanisms 600, 600' can be controlled to vertically move up or down relative to the rope 300. When the gear change mechanisms 600, 600' are switched to high gear, the movable pulley assemblies 650, 650' are vertically moved up relative to the ropes 300, 300' when the forcing apparatuses 400, 400' are stationary to contribute a part of the ropes 300, 300' to be pulled out of the first spiral reels 120, 120' and a part of the ropes 300, 300' be drawn into the second spiral reels 130, 130' to decrease the distances R, R' between the first contact points 310, 310' and the second contact points 320, 320', and the distances R, R' between the first contact points 310, 310' and the second contact points 320, 320' are further decreased when the forcing apparatuses 400, 400' are moved forward along with the linear movement parts 350, 350'. When the gear change mechanisms 600, 600' are switched to low gear, the movable pulley assemblies 650, 650' are vertically moved down relative to the ropes 300, 300' when the forcing apparatuses are stationary to contribute a part of the ropes 300, 300' to be pulled out of the second spiral reels 130 and a part of the ropes 300, 300' be drawn into the first spiral reels 120, 120' to increase the distances R, R' between the first contact point 310 and the second contact point 320, and the distance R between the first contact points 310, 310' and the second contact points 320, 320' are further increased when the forcing apparatuses 400 are moved backward along with the linear movement parts 350, 350'.

The above-mentioned driving axes 110 and 110' can be coaxial or heteraxial. When the driving axes 110 and 110' are coaxial and coupled to the one-way clutches (not shown) in the same direction, the speeds of the driving axes 110 and 110' can be changed synchronously. When the driving axes 110 and 110' are heteraxial and coupled to the one-way clutches (not shown) in the same direction, the speeds of the driving axes 110 and 110' can be changed synchronously or asynchronously, and the front-wheels driving tricycle 6000 can be driven to move forward or change its moving direction by controlling the speed of the right driving wheel 6700B and the speed of the left driving wheel 6700B' equal or unequal. When the speed of the driving axis 110' is greater than that of the driving axis 110, it will contribute the speed of the left driving wheel 6700B' to be greater than that of the right driving wheel 6700B, and the front-wheels driving tricycle 6000 will turn right. When the speed of the driving axis 110 is greater than that of the driving axis 110', it will contribute the speed of the right driving wheel 6700B to be greater than that of the left driving wheel 6700B', and the front-wheels driving tricycle 6000 will turn left.

This preset invention has been described by way of example and in terms of the preferred embodiments, it is to be understood that the invention is not limited to the disclosed-loop embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A continuously variable reciprocating prime mover, comprising:

a first roller coupled to a driving axis, wherein the driving axis comprises a first spiral reel and a second spiral reel symmetrical to each other relative to the driving axis, and the first spiral reel intertwines with the second spiral reel but not overlaps with each other, and a mechanical angle between the first spiral reel and the second spiral reel is 180°, wherein the first spiral reel has a first end terminal and a second end terminal respectively locating in the most inward and in the most outward of the first spiral reel, and the first spiral reel winds outwardly along with the driving axis and gradually changes its diameter, and the second spiral reel has a third end terminal and a fourth end terminal respectively locating in the most inward and in the most outward of the second spiral reel, and the second spiral reel winds outwardly along with the driving axis and gradually changes its diameter;

a second roller coupled to a stationary shaft;

a rope, wherein one terminal of the rope is fixed on the first end terminal of the first spiral reel to make the rope adjacent to the first end terminal of the first spiral reel be gradually winded from inward of the first spiral reel to outward of the first spiral reel and draw out of the first spiral reel at a first contact point of the first spiral reel, and then guided to wind the second roller and enter into the second spiral reel to make the other terminal of the rope be fixed on the fourth end terminal of the second spiral reel to make the rope adjacent to the fourth end terminal of the second spiral reel be gradually winded from outward of the second spiral reel to inward of the second spiral reel and draw out of the second spiral reel at a second contact point of the second spiral reel to form a closed loop, wherein the first contact point of the first spiral reel and the second contact point of the second spiral reel are on positions of an opposite mechanical angle, and the distance between the first contact point and the first end terminal equals to the distance between the second contact point and the third end terminal, and the rope has at least a tight linear moving part between the first roller and the second roller, and when the first contact point where the rope is pulled out of the first spiral reel locates at the second end terminal of the first spiral reel, the second contact point where the rope is pulled out of the second spiral reel will locate at the fourth end terminal of the second spiral reel;

a forcing apparatus coupled to the rope, wherein the forcing apparatus can be moved forward or backward along with the linear moving part of the rope, when the forcing apparatus is moved forward along with the linear moving part of the rope, the rope is pulled out of the first spiral reel and drawn into the second spiral reel, and the length pulled out of the first spiral reel is equal to the length drawn into the second spiral reel, and the first contact point and second contact point gradually leave away from the second end terminal and the fourth end terminal, and the distance between the first contact point and the second contact point decrease gradually, and when the forcing apparatus move backward along with the linear moving part of the rope, the rope is drawn into of the first spiral reel and pulled out the second spiral reel, and the length pulled out of the second spiral reel is equal to the length drawn into the first spiral reel, and the first contact point and second contact point gradually approach the second end terminal and the fourth end terminal, and the distance between the first contact point and the second contact point increase gradually; and a gear change mechanism provided on the rope between the first roller and the second roller, and the gear change mechanism can be controlled to vertically move up or down relative to the rope, wherein part of the rope is pulled out of the first spiral reel and part of the rope is drawn into the second spiral reel when the gear change mechanism is switched to high gear to decrease the distance between the first contact point and the second contact point by making the first contact point and the second contact point respectively be far away from the second end terminal and the forth end terminal, and wherein part of the rope is pulled out of the second spiral reel and part of the rope is drawn into the first spiral reel when the gear change mechanism is switched to low gear to increase the distance between the first contact point and the second contact point by making the first contact point and the second contact point respectively be close to the second end terminal and the forth end terminal, thereby continuous variable speed can be achieved by switching the gear change mechanism between high gear and low gear to decrease or increase the distance between the first contact point and the second contact point during the forcing apparatus moves forward or backward along with the linear moving part to continuously change its average torque in a stroke range.

2. The continuously variable reciprocating prime mover as claimed in claim 1, wherein the rope is made of a single material or joined by ropes made of different materials.

3. The continuously variable reciprocating prime mover as claimed in claim 1, wherein the gear change mechanism further comprises a movable pulley assembly, and part of the rope is pulled out of the first spiral reel and part of the rope is drawn into the second spiral reel when the gear change mechanism is switched to high gear to decrease the distance between the first contact point and the second contact point, and part of the rope is pulled out of the second spiral reel and part of the rope is drawn into the first spiral reel when the gear change mechanism is switched to low gear to increase the distance between the first contact point and the second contact point.

4. The continuously variable reciprocating prime mover as claimed in claim 1, further comprising a pulley between the first roller and the second roller to provide the rope with a tight linear moving part between the first roller and the second roller.

5. The continuously variable reciprocating prime mover as claimed in claim 1, further comprising a one-way clutch, wherein the first roller is coupled to the driving axis through the one-way clutch, and the torque generated by the forcing apparatus is transmitted to the driving axis through the one-way clutch when the rope is pulled out of the first spiral reel, and the torque generated by the forcing apparatus is not transmitted to the driving axis through the one-way clutch when the rope is pulled out of the second spiral reel which contributes the driving axis to be rotated along with a single direction.

6. A vehicle, comprising a continuously variable reciprocating prime mover as claimed in one of claim 1.

7. A vehicle, comprising two continuously variable reciprocating prime movers as claimed in claim 1, and the driving axes of the continuously variable reciprocating prime movers are coaxial or heteraxial.

8. The vehicle as claim in claim 7, wherein the driving axes of the continuously variable reciprocating prime movers are coaxial, and the one-way clutches of the continuously variable reciprocating prime movers are coupled to the driving axes in the same rotation direction.

9. The vehicle as claim in claim 8, wherein speeds of the driving axes are changed synchronously.

10. The vehicle as claim in claim 7, wherein the driving axes of the continuously variable reciprocating prime movers are heteraxial, and the one-way clutches of the continuously variable reciprocating prime movers are coupled to the driving axes in the same rotation direction.

11. The vehicle as claim in claim 8, wherein speeds of the driving axes are changed asynchronously.

* * * * *